United States Patent Office 2,727,126
Patented Dec. 13, 1955

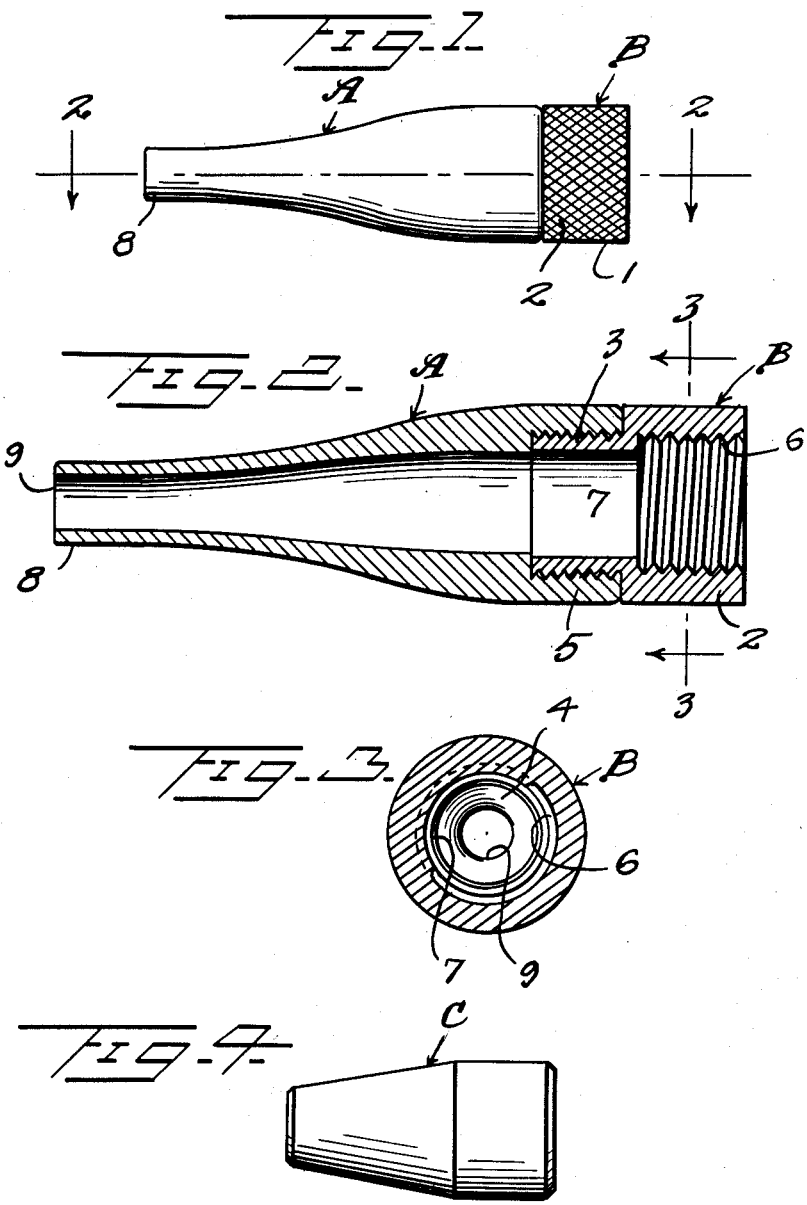

2,727,126

CERAMIC GAS NOZZLES FOR WELDING TORCHES

Freeman M. Guest and George E. Manis, Huntington, Ind., assignors to Model Engineering & Manufacturing, Inc., Huntington, Ind., a corporation Application March 10, 1952, Serial No. 275,842

2 Claims. (Cl. 219—14)

The primary object of our invention is to provide a new and novel nozzle design in combination with a metallic adapter which serves to dissipate the welding heat generated by the mechanical parts of the torch and thus prevent over-heating of the nozzle.

With the foregoing and other objects in view that will appear as the nature of our invention is better understood, the same consists in the novel features of construction, combination and arrangement of parts illustrated in the accompanying drawings and more particularly pointed out in the appended claims.

In the accompanying drawings, which are for illustrative purposes only and are therefore not drawn to scale:

Figure 1 is a side elevation of our new design of nozzle equipped with the adapter.

Figure 2 is a central longitudinal section, taken on line 2—2 of Figure 1.

Figure 3 is a vertical transverse section, taken on line 3—3 of Figure 2, and Figure 4 is an elevational view of the old ceramic gas nozzle now in use.

Referring to the drawings for a more particular description of our invention, and in which drawings like parts are designated by like reference characters throughout the several views, A designates our new design of gas nozzle and B the metallic adapter.

Specifically, the metallic adapter comprises a cylindrical body portion 1 having a knurled outer surface 2 and formed with a reduced exteriorly threaded tubular stem 3 for screw threaded engagement with the interiorly threaded bore 4 at the inner end 5 of the nozzle. The cylindrical body portion 1 of the adapter is formed on its inner wall with a spiral thread 6, while the inner wall 7 of the tubular stem 3 is smooth and substantially flush with the threaded inner wall of said body portion.

The metallic adapter serves to dissipate the heat that is generated by the electrical arc of the torch and prevents overheating of the nozzle.

Attention is invited to the fact that our nozzle A is greater in length than that of the nozzle C now commonly in use and is tapered at its outer end to a relatively small point 8, thus enabling the operator to get into more restricted or secluded places, that are difficult or impossible to reach with the old fashioned short nozzle with large opening now commonly in use.

The smaller bore or opening 9 in the pointed end 8 of our nozzle greatly reduces the amount of gas required for the welding operation and thus promotes greater economy. Further, the small bore or opening 9, which is made possible by the use of the adapter, permits the use of a smaller electrode and requires less pressure, consequently saving a considerable amount of gas, while increasing efficiency and promoting economy in operation.

Another advantage derived by reducing the size of the nozzle at its pointed end is that the operator's visibility is increased, since the obstruction to the point of application is reduced.

The greater length of the nozzle and the smaller pointed end, makes welding possible in corners and pockets that are inaccessible to the old type of nozzle.

Through the use of our invention, it is possible to perform more intricate welding operations, for the reason that there is a wider range of electrode diameters and it is estimated that economy in gas consumption will amount to approximately seventy five per cent.

From the foregoing description taken in connection with the drawings, it is thought that the construction, operation and advantages of our invention will be readily understood, without requiring a more extended explanation.

Having described our invention, what we claim as new and desire to secure by Letters Patent, is:

1. In combination with a gas nozzle for an arc welding torch comprising a tubular body portion formed of ceramic material having a relatively long tapering portion at one end formed with a small bore or opening, a metallic adapter screwing in the opposite end of said body portion and serving to dissipate the heat generated by the torch and prevent overheating of the nozzle, said metallic adapter comprising a cylindrical body having an interior thread and knurled heat dissipated outer surface and formed with a reduced exteriorly threaded stem adapted to screw into the said opposite end of said body portion.

2. A nozzle for use on an arc welding torch comprising an elongated tubular body formed of ceramic material having a high melting point and a high electrical insulating characteristic reduced in diameter at one end to provide a nozzle and having an internal recess at its opposite end, a metallic adapter at the said opposite end of said body, said adapter comprising a heat dissipating tubular sleeve of an external diameter corresponding to the size of said nozzle body, an exteriorly threaded stem projecting from said sleeve concentric therewith and of less external diameter than the latter, and the threads of said stem engaged with the walls defining said recess.

References Cited in the file of this patent

UNITED STATES PATENTS

| | | |
|---|---|---|
| 887,467 | Delacampe | May 12, 1908 |
| 1,958,085 | Hammon | May 8, 1934 |
| 2,343,958 | Crowe | Mar. 14, 1944 |
| 2,512,705 | Anderson | June 27, 1950 |